United States Patent [19]

McElroy, Jr.

[11] 4,044,100

[45] Aug. 23, 1977

[54] SEPARATION OF ACIDIC GAS CONSTITUENTS FROM GASEOUS MIXTURES CONTAINING THE SAME

[75] Inventor: Paul L. McElroy, Jr., Morristown, N.J.

[73] Assignee: Allied Chemical Corporation, Morris Township, N.J.

[21] Appl. No.: 239,366

[22] Filed: Mar. 29, 1972

Related U.S. Application Data

[63] Continuation-in-part of Ser. No. 883,338, Dec. 8, 1969, abandoned, which is a continuation-in-part of Ser. No. 445,774, April 5, 1965, abandoned.

[51] Int. Cl.² .............................................. B01D 53/34
[52] U.S. Cl. ..................................... 423/226; 423/228
[58] Field of Search ................................ 423/226–229

[56] References Cited

U.S. PATENT DOCUMENTS

| | | | |
|---|---|---|---|
| 2,139,375 | 12/1938 | Millar et al. | 423/228 |
| 2,600,328 | 6/1952 | Riesenfeld et al. | 423/229 |
| 3,266,866 | 8/1966 | Bally et al. | 423/229 |
| 3,347,621 | 10/1967 | Papadopoulos et al. | 423/228 |

*Primary Examiner*—Earl C. Thomas

[57] ABSTRACT

Acidic gas constituents are removed from a gaseous mixture by contacting the gaseous mixture with a single-phase liquid solution of a normally liquid dialkyl ether of a polyalkylene glycol and diisopropanolamine. Absorption conditions are selected to effect substantial absorption of the acidic gases while maintaining the solvent as a single-phase. The single-phase liquid solution containing absorbed acidic gases is separated from the resulting sweet gas and conducted to a stripping zone wherein the solution is subjected to conditions to effect removal of absorbed gas therefrom. The resulting stripped single-phase solution can be recycled for further contacting with gaseous mixtures containing acidic gases.

12 Claims, No Drawings

SEPARATION OF ACIDIC GAS CONSTITUENTS FROM GASEOUS MIXTURES CONTAINING THE SAME

CROSS REFERENCES TO RELATED APPLICATIONS

This application is a continuation-in-part of my copending application Ser. No. 883,338, filed Dec. 8, 1969, and now abandoned, which in turn is a continuation-in-part of my application Ser. No. 445,774, filed Apr. 5, 1965, and now abandoned.

BACKGROUND OF THE INVENTION

This invention relates to the separation of acidic gas constituents from gaseous mixtures containing the same in order to render such gaseous mixtures more suitable for their intended purposes.

Numerous instances are encountered of industrial processes employing a gaseous mixture for carrying out a reaction and of commercial applications involving the use of a gaseous mixture wherein it is necessary or at least highly desirable to remove or materially reduce the amount of any acidic gas constituent that may be present in such gaseous mixture. For example, in the production of ammonia from a synthesis gas containing hydrogen and nitrogen, it is essential that any carbon dioxide present in such synthesis gas as formed by substantially eliminated in order that the desired reaction can effectively take place. Similarly, any carbon dioxide, hydrogen sulfide, and/or carbonyl sulfide present in a natural gas or other gaseous hydrocarbon mixture must be significantly reduced in amount before such natural gas or gaseous hydrocarbon mixture is generally satisfactory for use as a fuel.

Such a gaseous mixture may be treated with an alkaline reagent to effect removal of its acidic gas content. Alkanolamines, especially the ethanolamines, have been widely used for this purpose and are conventionally employed in the form of their aqueous solutions. Absorption of the acidic gas constituent in such an aqueous alkanolamine solution is essentially by means of a strong chemical bond between the acidic gas and the alkanolamine; and for this reason it becomes possible to remove an acidic gas constituent to an extremely low level. On the other hand, a large amount of heat is required to break such strong chemical bond in order to regenerate the alkanolamine solution, with the result that the use of an alkanolamine for bulk removal of an acidic gas constituent from a gaseous mixture containing the same is rendered economically unattractive.

It has also been proposed to use a normally liquid dialkyl ether of a polyethylene glycol for this purpose. In this case absorption of the acidic gas constituent is almost wholly by means of a physical bond between the acidic gas and the polyethylene glycol dialkyl ether. Regeneration of such ether absorption medium is readily accomplished by stripping the same with an inert gas such as air, whereby bulk removal of an acidic gas constituent can be economically effected. Because of the limitation imposed by the equilibrium between the acidic gas in the gaseous mixture and that in the ether absorption medium, however, it is generally not possible to reduce the acidic gas content of such gaseous mixture to nearly as low a level as is frequently required. In addition, it is necessary to operate at a relatively high pressure in order to avoid too great a circulation rate of the ether absorption medium.

I have now found that, unexpectedly, these two absorption systems can be combined in such a way that bulk removal of an acidic gas constituent from a gaseous mixture containing the same and reduction of the amount of such acidic gas constituent to an extremely low level can be simultaneously effected in a very economical manner with avoidance to a large extent of the disadvantages inherent in each system alone.

U.S. Pat. No. 2,600,328 to Riensefeld et al. and U.S. Pat. No. 2,139,375 to Millar et al. are believed to be the most pertinent prior art. Each of Millar et al. and Riesenfeld et al. disclose removing acidic contaminants from gases by contacting said gases with an absorbent comprising a dialkyl ether of a polyalkylene glycol. Riesenfeld et al. additionally utilize an alkanolamine in conjunction therewith and Millar et al. indicate they may use an alkanolamine with their absorbent.

U.S. Pat. No. 2,600,328 discloses and I have verified that there is a strong tendency for phase separation of the absorbent to occur when removing one or more acidic gases from gaseous mixtures using a mixed absorbent comprising an ethanolamine and a dialkyl ether of a polyalkylene glycol. It is believed that such phase separation of the solvent is because of water-soluble salts formed in the solvent by reaction of the alkanolamine with the acid gases.

I have found that such phase separation of the solvent can be a principal limiting factor in the commercial use of mixtures of alkanolamines and dimethyl ethers of polyalkylene glycols for separation of acidic gas impurities from gaseous mixtures. Obviously, the formation of two liquid phases complicates the absorption process and requires a complex and expensive procedure for solvent recovery involving separation of the two phases and two stills or strippers for continuous recovery of the two liquid solvents. It is noteworthy that the prior art teaches away from the feasibilty of using an alkanolamine-polyalkylene glycol ether solvent as a single-phase solvent.

SUMMARY OF THE INVENTION

It is therefore an object of this invention to provide an improved process for separation of acidic gas constituents from gas mixtures containing the same utilizing a single-phase liquid solution of a normally liquid dialkyl ether of a polyalkylene glycol and diisopropanolamine, which process avoids the prior art problems of separation of the solvent into two liquid phases during the absorption step.

According to the invention, this objective is achieved by contacting a gaseous mixture containing an acidic gas constituent with a liquid solvent comprising a solution of a normally liquid dialkyl ether of a polyalkylene glycol and diisopropanolamine under conditions to effect absorption of the acidic gas constituent in the solvent while maintaining said solvent as a single phase.

DESCRIPTION OF THE INVENTION

Any dialkyl ether of a polyalkylene glycol that is normally a liquid and remains so under the conditions of operation can be utilized as the ether component of the solvent. Otherwise, as will be appreciated, difficulty may be experienced in satisfactorily maintaining the solvent in liquid from during its contact with the gaseous mixture containing the acidic gas constituent to be absorbed. The glycol ether should, of course, exhibit a relatively low vapor pressure over a wide temperature range in order to reduce any losses thereof to a minimum; and its boiling point should be sufficiently high so that it can be subjected to regeneration without significant volatilization at the elevated temperatures required to liberate the acidic gas absorbed by the solvent.

On the other hand, as the alkyl group increases in length and/or the alkylene group increases in length, the viscosity of such liquid glycol ethers tends to increase and may become a factor in determining the suitability of a particular glycol ether for use under the operating conditions that have been specified. For this reason it is generally desirable to employ a glycol ether having a lower alkyl group and a lower alkylene group such as the dimethyl ether, the diethyl ether, the dipropyl ether, or the dibutyl ether of a polyethylene glycol, a polypropylene glycol, or a polybutylene glycol.

Advantageously, the liquid glycol ether comprises a dimethyl ether of a polyethylene glycol; and it is preferred to employ one or more dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol. While any one of these six polyethylene glycol ethers may be so used and the dimethyl ether of tetraethylene glycol is especially excellent in this regard, it has been found that a mixture of all six of such polyethylene glycol ethers is generally as effective for all practical purposes. A particularly good mixture of this type is readily prepared by conventional Williamson synthesis from the monomethyl ethers obtained as the result of the reaction of ethylene oxide with methanol in the presence of an alkali such as sodium hydroxide, such mixture constituting a very economical source of the glycol ether solvent component.

The alkanolamine component of the solvent is diisopropanolamine due to the fact that it remains in a single-phase solution with the glycol ether under conditions of operation. Surprisingly, the use of diisopropanolamine enables a single-phase to be maintained under the prescribed operating conditions while the amine/glycol ether solvent system is capable of absorbing a quantity of acid gas, such as $CO_2$, beyond the capacity of an equivalent quantity of the amine itself to absorb such gas under similar conditions. Other closely related amines, on the other hand, when coupled with the claimed glycol ethers, evidence a reduced capacity to absorb such acid gases in a single-phase, under similar economically feasible process conditions.

The solvent may comprise a solution of the normally liquid polyalkylene glycol dialkyl ether and diisopropanolamine in any proportions that are suited to accomplish the desired absorption of the acidic gas constituent. As already intimated, however, care should be observed that the amount of diisopropanolamine is not such as to be likely to cause separation of the solvent into two phases under any of the operating conditions employed. The preferred polyethylene glycol dimethyl ether-diisopropanolamine solvent advantageously comprises by weight 35 to 90% of the former and 10 to 65% of the latter, and desirable 50 to 75% of the former and 25 to 50% of the latter.

From what has been set forth above, it will be apparent that absorption by the present solvent of an acidic gas constituent from a gaseous mixture containing the same proceeds simultaneously by two different mechanisms, namely, physical solution of the acidic gas in the polyalkylene glycol dialkyl ether and chemical reaction of the acidic gas with the alkanolamine; and that the acid gas is initially absorbed by the glycol ether and then migrates to the amine. Additionally, a significant portion of the acidic gas constituent also remains in the glycol ether. This is readily established by the fact that the heat input required to regenerate the present solvent is materially less than that which would be required if all or practically all of the acidic gas had chemically combined with the alkanolamine.

Contact of a gaseous mixture with the polyalkylene glycol dialkyl ether-diisopropanolamine solvent may be effected at any desired pressure. As a practical matter, however, the gaseous mixture is contacted with the solvent at a superatmosheric pressure sufficiently high to obtain a substantial degree of solution in the glycol ether component of the solvent of the acidic gas present in such gaseous mixture. The degree of solution of the acidic gas in such glycol ether component increases, of course, as the pressure is increased; but such effect of a pressure increase becomes progressively less as the proportion of the alkanolamine component of the solvent is increased since the acidic gas then reacts with the alkanolamine to an increasingly greater extent. Moreover, because of the increase of the solubility of the acidic gas in the glycol ether solvent component as the pressure is increased, it also becomes possible, as will be appreciated, to circulate correspondingly less solvent in contact with the gaseous mixture to accomplish the same degree of acidic gas removal. In view of these several factors, it will thus be apparent that operation of the present procedure becomes economically attractive only above a certain minimum pressure. For the preferred polyethylene glycol dimethyl ether-diisopropanolamine solvent such minimum pressure is generally about 150 pounds per square inch gauge, although pressures as low as 50 pounds per square inch gauge might be used in some specific instances. Preferably, the pressure is maintained between about 150 and about 1500 pounds per square inch gauge.

I have found that the maximum partial pressure of the acidic gas constituents in the gaseous mixture should be limited, for example, by controlling the total pressure, to prevent formation of two liquid phases in the solvent during the absorption step. It is apparent that higher partial pressures tend to increase the degree of solution of the acidic gases in the solvent, and two distinct liquid phases are observed when the partial pressure over the solvent is increased to a particular pressure at a given temperature. As the temperature is raised, the pressure of carbon dioxide or hydrogen sulfide or a mixture of both required to obtain two liquid phases rises at a constant rate. By way of example only, the maximum pressures of carbon dioxide permissible to maintain a single-phase in the preferred solvent of the invention increases from 35 to 260 pounds per square inch gauge as the absorption temperature is increased from 40° to 70° C.

Since the acidic gas constituent of the gaseous mixture dissolves in the glycol ether component of the solvent to a greater extent as the temperature is lowered, it will be appreciated that as low a temperature should be used as is compatible with the overall economical operation of the present procedure. Care should be exercised, however, that the absorption temperature remains above that at which the alkanolamine may tend to separate out of solution with the glycol ether. By way of example only, a temperature of about 15° to 90° C. can be used with a solvent comprising a solution by weight of 25 to 50% of diisopropanolamine in 50 to 75% of a mixture of the six polyethylene glycol ethers mentioned above. Preferably, the absorption temperature is maintained between about 60° and 80° C. in the lower part of the absorption column where acidic gas concentration in the gas mixture is greater.

The present procedure may be effectively carried out in a cyclic manner by contacting the gaseous mixture in an absorption zone with the solvent at a suitable superatmospheric pressure to effect absorption in the solvent of the acidic gas constituent contained in such gaseous mixture, passing solvent containing absorbed gas to a stripping zone maintained at a pressure substantially lower than that in the absorption zone, subjecting such solvent containing absorbed gas to conditions in such stripping zone to effect removal of absorbed gas therefrom, and returning the resulting desorbed solvent to the absorption zone for further contact with the gaseous mixture. Generally, the absorption zone comprises a packed or plate absorption column, into the bottom of which the gaseous mixture is introduced for countercurrent contact with the solvent introduced at the top of the column. Similarly, the stripping zone comprises a packed or plate stripping column, into the top of which solvent containing absorbed gas is introduced and in which such absorbed gas is separated from the solvent by the combined effect of the pressure reduction, heat supplied to the column, and stripping steam generated from water desirably present in the column. Provision is preferably made, prior to the introduction of the solvent containing absorbed gas into the stripping column, for subjecting such solvent to flashing in a flash tank maintained at a pressure intermediate that in the absorption column and that in the stripping column for substantial separation of any small amounts of absorbed gases other than the acidic gas from the solvent so that the stripped acidic gas can be recovered from the stripping column in a relatively pure state for use as desired.

As indicated above, water is advantageously present in the stripping column to provide steam for stripping of the dissolved acidic gas constituent from the glycol ether component of the solvent. Such water can be essentially maintained in the stripping column by condensation of steam from the gases removed from the top of the column with return of the resulting condensate to the column and reboiling of at least a portion of the stripped solvent leaving the bottom of the column to convert any water remaining therein to steam.

Water may, however, also be included as a component of the solvent circulated through the absorption column. It has been found in this connection that, as the proportion of water contained in the solvent introduced into the stripping column is increased, the amount of absorbed acidic gas remaining in the stripped solvent is decreased. On the other hand, as the proportion of water contained in the solvent introduced into the absorption column is increased, it has been found that the capacity of the solvent to absorb the acidic gas constituent is decreased. It becomes necessary, therefore, to strike a balance between these two factors in determining the proportion of any water included in the solvent circulated through such a cyclic system.

Generally speaking, the solvent introduced into the absorption column may contain from 0–15%, preferably 0 to 10% by weight of water; and, as a practical matter, there will usually be at least 0.5% of water in such solvent. Care should be observed, of course, to avoid the use of such a proportion of water in the solvent that separation of the solvent may occur under the conditions maintained in the absorption column. It should be noted in any event that inclusion of water in the present solvent is not essential for its satisfactory use in absorbing an acidic gas constituent from a gaseous mixture containing the same.

The present procedure is applicable in general to the separation of an acidic gas constituent from a gaseous mixture containing the same, and is capable of reducing the carbon dioxide level to below 100 ppm under proper operating conditions. It is particularly useful in treating a gaseous mixture containing one or more of carbon dioxide, hydrogen sulfide, and carbonyl sulfide for separation of such acidic gases therefrom; and such use of the instant procedure constitutes a preferred embodiment of the present invention. Other gases capable of being removed, along with carbon dioxide, include mercaptans, carbon disulfide, alkyl sulfides and alkyl disulfides. Typical examples of gaseous mixtures that can be so treated include ammonia synthesis gas containing carbon dioxide and natural gas containing hydrogen sulfide, carbon dioxide, and carbonyl sulfide.

The following examples are illustrative of the present invention:

EXAMPLE 1

An ammonia synthesis gas having the following composition:

|  | Volume % |
|---|---|
| Hydrogen | 61 |
| Nitrogen | 20 |
| Carbon Dioxide | 18 |
| Carbon Monoxide, Methane, Argon | 1 | is introduced at 40° C. at the rate of 75,000 cubic feet (measured at standard conditions) per minute into the bottom of a plate absorption column maintained at a pressure of 325 pounds per square inch gauge. Liquid solvent comprising a solution by weight of 47% of a mixture of polyethylene glycol dimethyl ethers having the following composition:

|  | Weight % |
|---|---|
| Dimethyl ether of diethylene glycol | 9 |
| Dimethyl ether of triethylene glycol | 20 |
| Dimethyl ether of tetraethylene glycol | 26 |
| Dimethyl ether of pentaethylene glycol | 22 |
| Dimethyl ether of hexaethylene glycol | 19 |
| Dimethyl ether of heptaethylene glycol | 4 |

47% of diisopropanolamine, and 6% of water is pumped at 40° C. into the top of the absorption column at the rate of 4,000 gallons per minute. Solvent temperature is about 71° C. in the lower part of the absorption column and there is no phase separation of the solvent. The ammonia synthesis gas with its carbon dioxide content reduced to less than 500 parts per million, the maximum generally considered economically permissible for an ammonia synthesis plant utilizing methanation as the final $CO_2$—CO cleanup, is taken off from the top of the absorption column. Solvent containing absorbed carbon dioxide is withdrawn from the bottom of the absorption column at 71° C. and is passed through a hydraulic power-recovery turbine (to supply supplementary power to the solvent-circulating pump) into a flash tank operated at a pressure of 60 pounds per square inch gauge. By reason of such pressure reduction the small amounts of hydrogen and nitrogen that have also been absorbed by the solvent are substantially flashed therefrom and vented along with a relatively small portion of the carbon dioxide. The solvent removed from the flash tank is heated to 99° C. and is introduced at a reduced pressure of 5 pounds per square inch gauge into the top of a plate stripping column for regeneration by means of heat and steam-stripping. Heat is provided to the stripping column by a reboiler maintained at 116° C. through the use of 160,000 pounds per hour of steam supplied at a pressure of 50 pounds per square inch gauge. Carbon dioxide and steam are removed overhead from the stripping column; the steam is condensed, and the resulting water condensate is cooled to 40° C. and returned to the top of the stripping column. Hot stripped solvent is withdrawn from the bottom of the stripping column and is pumped to a pressure above that maintained in the absorption column; it is then cooled to 88° C. by interchange with the carbon dioxide-containing solvent passing from the flash tank to the stripping column, further cooled to 40° C. in a cooler, and returned to the top of the absorption column.

EXAMPLE II

A typical raw natural gas having the following composition:

|  | Volume % |
|---|---|
| Methane | 91.130 |
| $CO_2$ | 6.768 |
| $H_2S$ | 0.032 |
| Carbonyl Sulfide | 0.005 |
| Ethane | 0.014 |
| Propane | 0.010 |
| He | 0.030 |
| $N_2$ | 2.011 | is introduced at a temperature of about 20° C. at the rate of 6,150 pounds per minute into the bottom section of a 40 valve-tray absorption column maintained at a pressure of 900 pounds per square inch gauge. The gas flows upward through the column countercurrent to the absorbing solution is introduced at 40° C. into the top section. Maximum temperature in the absorption column is about 70° C. in the lower part of the column. The absorbing solution is fed to the column at the rate of about 16,800 pounds per minute, comprising 7,560 pounds per minute of a mixture of polyethylene glycol dimethyl ethers having the approximately same composition as in Example I, 7,560 pounds per minute of diisopropanolamine, and 1,646 pounds per minute of water. Sufficient absorption stages are provided by the 40 trays to reduce the carbon dioxide and sulfide content in the exit gas to less than 0.6 volume percent and 2 ppm, respectively. The solvent solution remains as a single-phase solution during the absorption operation. The purified natural gas meets pipeline specifications.

The absorbing solution exits the absorber, at 900 pounds per square inch gauge and 70° C., passes through a power recovery turbine where pressure is reduced to 50 pounds per square inch gauge. Absorbed hydrocarbons, mainly methane, are released during this pressure reduction and are separated from the absorbing solution in a flash tank. The flashed gas may be used as a fuel for steam generation in the process.

The absorbing solution from the flash tank at 50 pounds per square inch guage is heated to 100° C. and introduced into the top of a packed stripper column where the pressure is reduced to 2 pounds per square inch gauge and part of the acidic gases is flashed off. The absorbing solution flows down through the packing in the stripper where additional acidic gases are released by contacting a hot gas stream, mainly steam, from the bottom section of the column. Most of the residual acidic gases are removed from the solution by boiling in a reboiler section of the stripper column. Heat for the reboiler operation is provided by steam from a steam generator.

The gases from the stripper column flow through a condenser where water is condensed and returned to the process. The absorbing solution at 120° C. exits the stripper, is cooled to 40° C. and pumped to the absorption column.

EXAMPLE III

The mutual solubility of carbon dioxide and hydrogen sulfide is determined for various partial pressures of carbon dioxide and hydrogen sulfide over a solvent containing 47 weight percent of a mixture of polyethylene glycol dimethyl ethers having the same composition as in Example I, 46 weight percent diisopropanolamine and 7 weight percent water. The solvent is weighed into a cylinder of known volume. Weighed quantities of carbon dioxide and hydrogen sulfide are added, and the cylinder contents mixed with a mechanical shaker in a constant temperature bath. The carbon dioxide and hydrogen sulfide in the vapor phase are analyzed, and the concentration of hydrogen sulfide and carbon dioxide in the liquid phase determined by calculating the weight of each component in the vapor phase and substracting this from the total weight of each component. Results are shown in Table I.

TABLE I
MUTUAL SOLUBILITY OF HYDROGEN SULFIDE AND CARBON DIOXIDE IN SOLVENT

| Temperature ° C. | Partial Pressure $CO_2$, psia | Weight % $CO_2$ in Liquid Phase | Partial Pressure $H_2S$, psia | Weight % $H_2S$, Liquid Phase |
|---|---|---|---|---|
| 38 | 4.0 | 5.67 | 8.6 | 2.21 |
| 38 | 12.6 | 6.55 | 4.7 | 0.95 |
| 38 | 11.2 | 6.43 | 8.3 | 1.43 |
| 38 | 1.24 | 2.96 | 16.9 | 5.18 |
| 49 | 4.7 | 5.11 | 4.4 | 1.06 |
| 49 | 10.8 | 5.96 | 5.7 | 0.92 |
| 49 | 52.4 | 7.29 | 4.1 | 0.47 |
| 49 | 3.5 | 4.54 | 10.2 | 2.07 |
| 49 | 23.8 | 6.42 | 9.0 | 1.19 |
| 49 | 41.4 | 7.01 | 10.1 | 1.16 |
| 49 | 7.9 | 4.96 | 17.6 | 2.74 |
| 49 | 19.7 | 5.94 | 16.8 | 2.35 |
| 49 | 30.8 | 6.43 | 18.3 | 2.14 |
| 60 | 10.0 | 4.71 | 9.1 | 1.33 |
| 60 | 53.0 | 6.36 | 14.0 | 1.39 |
| 60 | 77.9 | 7.11 | 12.1 | 1.09 |
| 60 | 3.9 | 3.15 | 23.1 | 3.63 |
| 60 | 56.9 | 6.60 | 19.1 | 1.56 |
| 60 | 41.5 | 6.12 | 25.1 | 2.05 |
| 60 | 6.5 | 3.21 | 33.5 | 4.09 |
| 60 | 31.0 | 5.39 | 30.0 | 2.78 |
| 60 | 66.5 | 6.47 | 34.5 | 2.85 |

At these temperatures and partial pressures there is no separation of the solvent into two phases.

EXAMPLE IV

Tests similar to those of Example III are conducted to determine the maximum pressure of hydrogen sulfide, carbon dioxide, and 1:1 mol ratio $CO_2$—$H_2S$ mixtures which will maintain a single liquid phase in the solvent.

The solvent mixture is the same as that used in Example III. The two immiscible liquid phases are observed in a high pressure glass ampoule. Pertinent data are shown in Table II

TABLE II

Maximum Pressures of $CO_2$, $H_2S$ and $CO_2$-$H_2S$ Mixture Permissible To Maintain Single Liquid Phase In Solvent

| Gas | Temperature, ° C. | Maximum Pressure, psig |
|---|---|---|
| $CO_2$ | 35 | 20 |
| $CO_2$ | 40 | 35 |
| $CO_2$ | 45 | 70 |
| $CO_2$ | 52.2 | 130 |
| $CO_2$ | 60 | 185 |
| $CO_2$ | 70 | 260 |
| $H_2S$ | 40 | 20 |
| $H_2S$ | 60 | 38 |
| 1:1 Mol Ratio $CO_2$-$H_2S$ Mixture | 60 | 88 |

I claim:

1. A method of separating carbon dioxide from a gaseous mixture containing same which comprises contacting the gaseous mixture in an absorption zone with a liquid solvent comprising a solution of from 10 to 65% by weight of di-isopropanolamine and of from 35 to 90% by weight of a normally liquid dialkalyl ether of a polyalkalylene glycol under conditions which effect absorption of the carbon dioxide in the solvent while controlling temperature at above about 15° to 90° C. and total pressure between about 50 and 1500 pounds per square inch gauge such as to maintain said solvent as a single phase.

2. A method as claimed in claim 1 wherein the gaseous mixture contains at least one additional acidic gas constituent selected from the group consisting of hydrogen sulfide and carbonyl sulfide.

3. A method as claimed in claim 2 wherein the liquid solvent comprises a solution by weight of 10 to 65% of diisopropanolamine and 35 to 90% of a normally liquid dimethyl ether of a polyethylene glycol, and the gaseous mixture is contacted with the liquid solvent at a pressure of at least 150 pounds per square inch gauge.

4. A method as claimed in claim 3, wherein the polyethylene glycol dimethyl ether comprises at least one member selected from the group consisting of the dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol.

5. A method as claimed in claim 4, wherein the polyethylene glycol dimethyl ether comprises the dimethyl ether of tetraethylene glycol.

6. A method as claimed in claim 3, wherein the polyethylene glycol dimethyl ether comprises a mixture of the dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol.

7. A method as claimed in claim 6, wherein the solvent from the absorption zone containing absorbed gas is passed to a stripping zone maintained at a pressure substantially lower than in the absorption zone, said solvent containing absorbed gas subjected to conditions in said stripping zone to effect removal of absorbed gas therefrom, and the resulting desorbed solvent recycled to said absorption zone for further contact with said gaseous mixture.

8. a method as claimed in claim 7, wherein the liquid solvent comprises a solution by weight of 25 to 50% of diisopropanolamine and 50 to 75% of the polyethylene glycol dimethyl ether.

9. A method as claimed in claim 8, wherein the absorption zone is maintained at a temperature of from about 15° C. to about 90° C. and the solvent additionally contains water maintained in an amount between about 0.5% and about 15% by weight.

10. A method as claimed in claim 9, wherein the pressure in the absorption zone is maintained between about 50 to 1,500 pounds per square inch gauge, the temperature in the lower part of the absorption zone is maintained at about 70° C.

11. A method as claimed in claim 10, wherein the gaseous mixture is an ammonia synthesis gas.

12. A method as claimed in claim 10, wherein the gaseous mixture is a sour natural gas.

* * * * *